D. H. BELLAMORE.
ARMORED PROTECTOR FOR MOTOR VEHICLE RADIATORS.
APPLICATION FILED MAR. 17, 1915.

1,182,886.

Patented May 16, 1916.
2 SHEETS—SHEET 1.

WITNESSES:
C. Jahnke
F. S. Fitzsimons

INVENTOR
David H. Bellamore.
BY
Jas. H. Griffin
Attorneys

D. H. BELLAMORE.
ARMORED PROTECTOR FOR MOTOR VEHICLE RADIATORS.
APPLICATION FILED MAR. 17, 1915.
1,182,886.
Patented May 16, 1916.
2 SHEETS—SHEET 2.
Fig. 3.
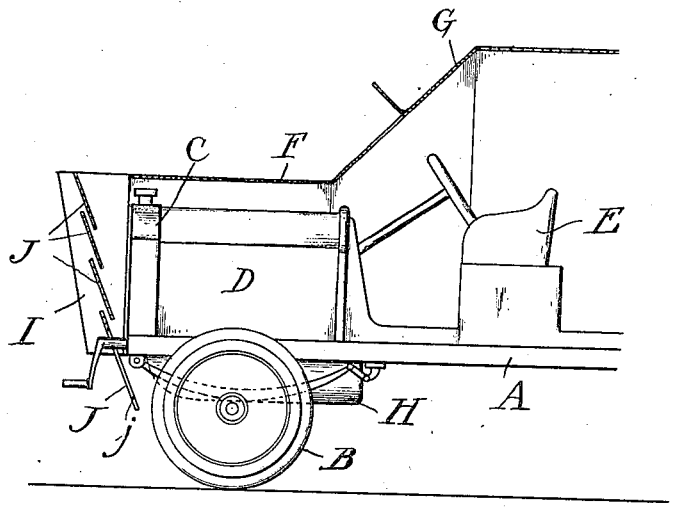
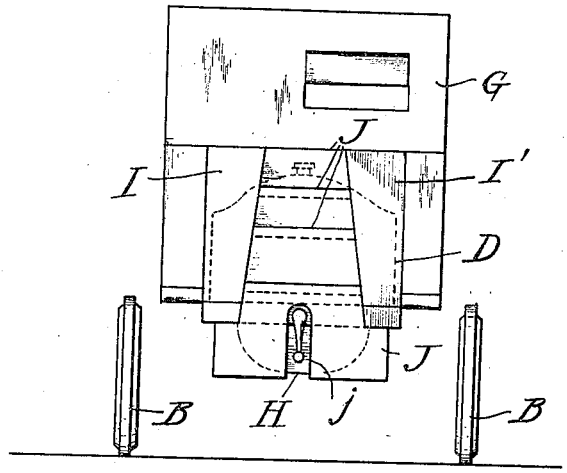
Fig. 4.
WITNESSES:
C. Zabriskie
F. S. Fitzsimons
INVENTOR
David H. Bellamore.
BY
Jas. H. Griffin
Attorneys

UNITED STATES PATENT OFFICE.

DAVID H. BELLAMORE, OF NEW YORK, N. Y., ASSIGNOR TO THE STANDARD ORDNANCE CORPORATION, OF NEW YORK, N. Y., A CORPORATION OF NEW YORK.

ARMORED PROTECTOR FOR MOTOR-VEHICLE RADIATORS.

1,182,886.  Specification of Letters Patent.  Patented May 16, 1916.

Application filed March 17, 1915. Serial No. 15,137.

*To all whom it may concern:*

Be it known that I, DAVID H. BELLAMORE, a subject of the King of Great Britain, residing at the city of New York, borough of Manhattan, county and State of New York, have invented a certain new and useful Armored Protector for Motor-Vehicle Radiators, of which the following is a specification.

This invention is a protector or armor for motor vehicle radiators.

The primary object of the invention is to render such radiators proof against bullets, and yet not materially interfere with the customary air cooling of the radiators.

A further object of the invention consists in providing the protector with coöperating means for cutting or severing any ordinary obstructions which the machine may encounter, and which might, ordinarily, impede its progress, such as barb wire, or similar baffles.

As a feature of the invention, the front of the protector is provided with an opening through which the engine may be cranked without disturbing the protector.

Speaking generally, of the preferred form of the invention, it embodies three members or units positioned one on each side of the radiator and a front member, coöperating therewith, all of said members being suitably supported on the framework of the machine. The front member is preferably composed of a plurality of overlapping units, suitably arranged or spaced so that a free passage of air is permitted between them.

Features of the invention, other than those described, as well as the important functions of the device, as a whole, will appear from the hereinafter detailed description taken in conjunction with the appended drawings.

In the accompanying drawings I have illustrated one practical embodiment of the invention, but the construction shown therein is to be understood as illustrative, only, and not as defining the limits of the invention.

Figure 1:
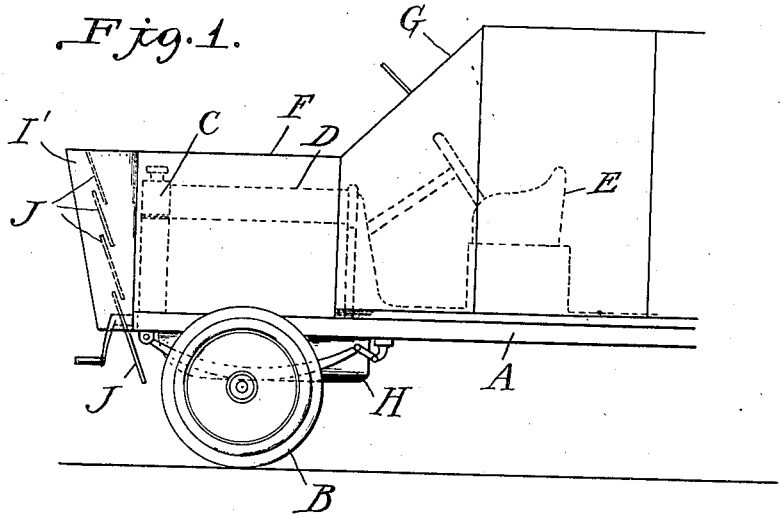
Figure 2:
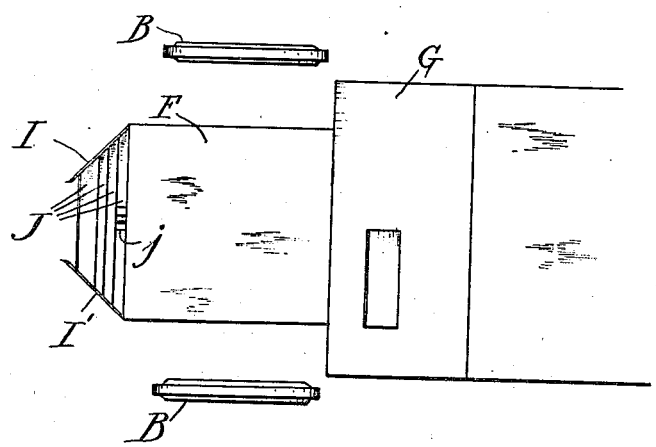

Figure 1 is a side elevation of the forward part of an armored motor vehicle showing the present invention as applied thereto. Fig. 2 is a plan view of Fig. 1. Fig. 3 illustrates the motor vehicle in elevation with the armoring devices shown in central longitudinal section, and Fig. 4 is a front elevation of the vehicle shown in the figures previously described.

Referring to the drawings, A designates a chassis of a motor vehicle embodying forward wheels B, radiator C, hood D, and any suitable driver seat E. The top and sides of the radiator are housed within a casing F of armor plate or bullet-proof material, whereas the body of the car is protected by a further housing G of similar type, but of increased size.

As usual, the engine H is positioned upon the chassis beneath hood D, and is protected from falling bullets or from lateral gun-fire by housing F, as will be understood. The housing F is rigidly secured to the chassis in any suitable manner so as to be adapted to withstand the impact of bullets, etc.

It has been suggested in the past to armor motor vehicles in the general manner thus far described, and, as the front of the radiator is particularly susceptible to injury, it has been attempted to protect the same by means of stationary armor plate positioned to close the front of the housing F. With the front of the housing F closed, however, the engine does not obtain the required cooling air currents, with the result that said engine is apt to heat up and "stall." To overcome this objection, hinged doors of bullet proof steel have been placed on the front of the radiator, said doors being closed when the machine is under the enemies' fire and opened when the machine is in action. The disadvantages of such structures, as described, will be manifest; if the vehicle is attacked suddenly with the doors of the front of the radiator open, shots may be readily directed into the radiator with a view to disabling the vehicle. Manifestly, moreover, the engine cannot run for any length of time with the doors closed.

With the foregoing disadvantages in mind, the present invention provides means whereby cooling air currents may be supplied to the radiator at all times without in any way whatever exposing the vulnerable parts thereof. In the preferred method of practising the present invention a pair of complementary plates I I' are rigidly mounted in any suitable manner at each side of housing F and at the forward edge thereof. These plates are of bullet-proof material, and, to facilitate the deflection of bullets, converge forwardly of the machine, thereby operating to protect the front of the radiator from a glancing shot, and at the same time forming a support for protecting members J positioned immediately in front of the radiator.

Protecting members J are preferably in the form of slats which are positioned one above the other in overlapped relation, each slat extending substantially horizontally, and secured at its opposite ends by any suitable means to plate I I'. The overlapped portions of any two adjacent plates are not in contact, but are placed somewhat apart so as to allow of the passage of air between them. Any number of slats may be employed and they may overlap in any desired manner so long as the front of the radiator is protected from forward attack. The lowest slat J is preferably extended below the frame A of the machine to such extent as to adequately protect that portion of the engine which generally depends below said frame, said lower slat being cut away as at $j$ to allow of the cranking mechanism to be passed therethrough, and operated forwardly of said slat.

While not entirely essential, it is preferable to position slats J in angular relation to the base of the radiator so that currents of air in engaging with said slats will be deflected through the slots intermediate the overlapped portions of said slats.

It will be manifest from the foregoing that, when the engine is running, currents of air will be constantly flowing between the edges of the slats J and over the engine, thereby allowing the same to operate with maximum efficiency irrespective of the presence of the protecting devices.

It is quite common for belligerent armies to stretch barbed wire and other obstructions across highways, etc., for the purpose of checking the advance of their opponents. Not only are these obstructions dangerous to a rapidly moving car, but should they be observed, it would be necessary to stop the vehicle in order that the obstruction may be manually cut down. According to the present invention, however, the armoring devices of the radiator are so constructed as to automatically clear away obstructions of the type specified. To this end, the forward ends of the plates I I' are sharpened into knife edges so that, when brought into forcible contact with barbed wire or the like, said edges will serve to sever the wire. To facilitate this operation, the cutting edges of plates I I' are preferably depended, as shown more particularly in Figs. 1 and 3. Thus, when a car equipped as described, and traveling with a fair degree of speed comes in contact with barbed wire, or other similar obstructions, said wire will be forced downwardly along the tapered knife edges of plates I I', thereby greatly expediting the cutting operation of said knife edges. I have shown the knife edges as only slightly tapered, although this degree of tapering may be either increased or decreased, as desired. Moreover, the knife blades may depend beyond the frame A of the car so as to cut any obstructions which might engage with the car intermediate the upper portion of the hood and the axle.

It will be understood that, in the foregoing description, I have set forth the preferred embodiment of my invention, but the invention is not to be understood as limited to this disclosure, said invention being considered broadly new as is commensurate with the appended claims.

Having thus fully described the invention, what I claim as new, and desire to secure by Letters Patent, is:—

1. A protector for motor vehicle radiators embodying two side members, the forward edges of which are sharpened to form cutting edges, and a coöperating front member, said front member being provided with suitable air inlets.

2. A protector for motor vehicle radiators, embodying a plurality of bullet-proof slats fixedly positioned in stationary, overlapping relation forwardly of the radiator, and provided with air passages intermediate the adjacent slats whereby air currents may circulate through the radiator at all times, while effectually protecting said radiator from damage by bullets.

3. A protector for motor vehicle radiators embodying two side members and a coöperating front member, said front member being composed of a plurality of rigid, stationary bars or slats suitably spaced apart and adapted to allow of the circulation of air through the radiator at all times.

4. A protector for motor vehicle radiators embodying two side members and a coöperating front member, said front member being composed of a plurality of separated, overlapping fixed bars whereby bullets cannot pass between them and yet permit of a free circulation of air to the radiator at all times.

5. A protector for motor vehicle radiators, embodying a plurality of bullet-proof slats fixedly positioned in stationary, overlapping relation forwardly of the radiator, and provided with air passages intermediate the adjacent slats whereby air currents may circulate through the radiator at all times, while effectually protecting said radiator from damage by bullets, and cutting means coöperating with said slats for severing obstacles and obstructions in the path of the vehicle.

6. A protector for motor vehicle radiators embodying two side members the forward edges of which are sharpened to form cutting edges, and a plurality of slats secured at their opposite ends to said side members, and provided with interspaced openings through which air is adapted to circulate.

7. A protector for motor vehicle radiators embodying two coöperating side members rigidly secured adjacent said radiator and converging forwardly thereof, and a plurality of overlapping slats secured at their opposite ends to said side members, the lowest slat extending below the radiator to such extent as to shield those parts of the vehicle which depend below the frame thereof from forward attack, and said slats being so spaced as to allow of the passage of air between their overlapping edges.

8. A protector for motor vehicle radiators embodying two side members rigidly secured relative to the radiator and tapered downwardly, said side members being sharpened along their forward edge to serve as cutting blades, and a front member positioned intermediate the side members for precluding the entrance of bullets into said radiator.

9. A protector for motor vehicle radiators embodying two side members rigidly secured relative to the radiator and tapered downwardly, said side members being sharpened along their forward edge to serve as cutting blades, and a front member positioned intermediate the side members and rigidly secured thereto for precluding the entrance of bullets into said radiator.

10. A protector for motor vehicle radiators embodying a pair of coöperating side members and a plurality of slats positioned between said side members and extending across the front of the radiator, the overlapping portions of said slats being spaced apart, and said slats being disposed in angular relation to the face of the radiator, whereby, when the motor vehicle is in motion, air is deflected by said slats so as to pass intermediate the overlapped portions thereof and into engagement with the radiator.

11. A protector for motor vehicle radiators, embodying a knife-edged member positioned forwardly of the radiator for severing obstacles in the path of the vehicle, in combination with bullet-proof means also positioned forwardly of the radiator and provided with openings whereby air currents may circulate through the radiator at all times, while effectually protecting said radiator from damage by bullets.

In testimony whereof I have signed my name to this specification in the presence of two subscribing witnesses.

DAVID H. BELLAMORE.

Witnesses:
CORNELIUS ZABRISKIE,
F. S. FITZSIMONS.